March 26, 1929.  C. P. JAEGER  1,706,611
TOASTING DEVICE
Original Filed June 4, 1925
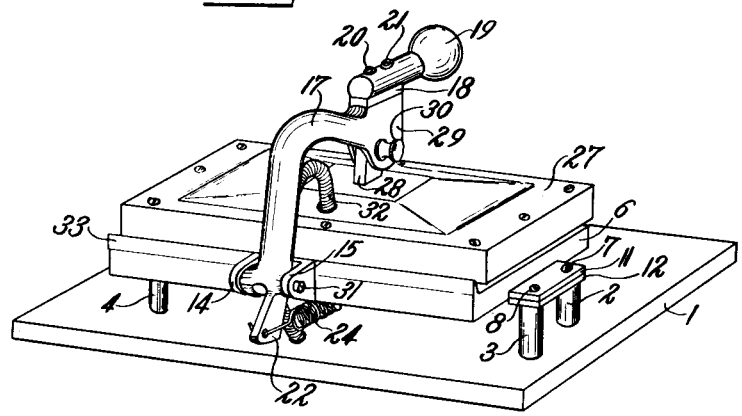
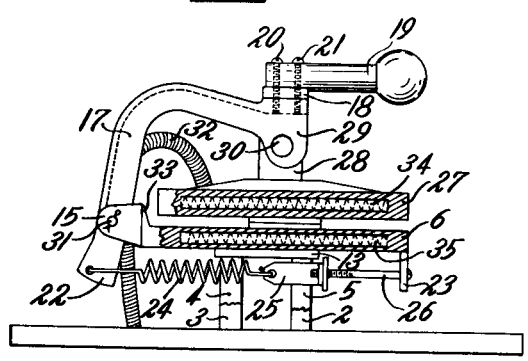
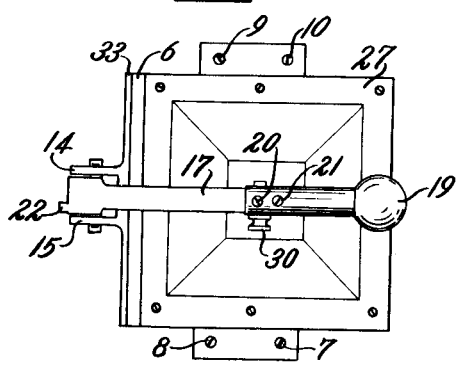
Inventor
Charles P. Jaeger
George Auer Atty.

Patented Mar. 26, 1929.

1,706,611

UNITED STATES PATENT OFFICE.

CHARLES P. JAEGER, OF CHICAGO, ILLINOIS.

TOASTING DEVICE.

Original application filed June 4, 1925, Serial No. 34,842. Divided and this application filed February 17, 1928. Serial No. 255,074.

The present application is a division of co-pending application, Serial No. 34,842, filed June 4, 1925, and the invention disclosed herein relates, broadly stated, to automatic toasters, and is more particularly concerned with a device for toasting sandwiches.

Before discussing the objects and features of the present invention, it will be advisable to mention briefly a few principles involved in the current methods of preparing an ordinary toasted sandwich, and to recall the various features of the products furnished by these methods.

The manner of preparing an ordinary sandwich consists in inserting certain desirable ingredients between two slices of bread, and, if a toasted sandwich is desired, the bread is separately toasted on one or on both sides, and then used for covering the desirable intermediate layer of foodstuff. This process and procedure is well known and does not need further explanation.

A disagreeable feature of the method intimated above, which may very well be recognized as inherent disadvantage, resides in the fact that the preparation of the toasted bread is separated from the preparation of the intermediate layer of foodstuff which is to be inserted between the slices of toasted bread. A piece of meat, for example, is broiled, fried, or otherwise prepared, and two slices of bread are toasted in some desirable manner, and these toasted slices of bread are then used for covering the previously and separately prepared piece of meat. The product is frequently called a toasted sandwich.

Considering the terms " toasted sandwich " critically, in the light of the foregoing discussion, it will be seen at once that the name is a misnomer if applied to a product that originated in a manner outlined above. The term " sandwich " may well be defined as meaning two slices of bread having an intermediate layer of some desirable foodstuff, such as meat, cheese, etc. The product of the orthodox procedure is, therefore, not a toasted sandwich, but toasted bread used for a sandwich.

It is the principal object of the present invention to provide an apparatus which may be used for broiling, cooking, or frying a variety of food products and particularly for toasting sandwiches, in the true meaning of the term, e. g., for inserting an entire sandwich consisting of two slices of ordinary unprepared bread and having an intermediate layer of some desirable unprepared ingredient, such as meat, and for treating this sandwich as a unit, thereby toasting the outer surfaces of the bread and simultaneously cooking, broiling or steaming the intermediate layer. The sandwich thus produced will be a true " toasted " sandwich, however critically one may choose to approach the terms.

The numerous advantages of such an apparatus are obvious.

In the first place, a genuine toasted sandwich is produced in one operation, whereas two or more operations were formerly required to furnish an imitation of a toasted sandwich. The process will be more hygienic and cleaner due to the elimination of various steps, all of which required some handling of the food, and it will at the same time be cheaper and simpler than formerly. Together with these evident advantages relating to hygiene and cost of production, there appear culinary features which will readily be appreciated by producers and consumers alike.

In the old process, due to preparing the bread separate from the layer, it frequently happened that the bread was toasted too crisp, or that the two slices were toasted unequal. The consumer was, therefore, subjected to the disagreeable experience of masticating a sandwich which seemed to consist of alien and opposed elements. The present invention avoids this possibility, because both slices of bread are toasted at the same time. To cite another disadvantage resulting from the orthodox method, it occurred frequently that the intermediate layer did not agree in temperature with the temperature of the toasted bread. The instant invention eliminates this unplesant feature, because both, layer and bread, are prepared simultaneously, as a unit. The outer surfaces of the slices of bread are toasted, leaving soft center surfaces which, during the process of toasting the bread, are permeated by the liquids and flavors of the steaming intermediate layer, making the sandwich more palatable. While the bread is toasted, the intermediate layer will be cooked or otherwise finished, and will form an integral part of the product. In general, the process which is made possible by the present invention, will render a superior article. In fact, it may truly be said to furnish an entirely new product or a heretofore unknown delicious form of a known article.

The invention also opens numerous possibilities of handling and preparing a great variety of food products in a more sanitary way than customary.

For example, sandwiches may be prepared in a packing plant which is equipped to observe all rules of hygiene, wrapped in suitable paper, such as stiff wax paper, and shipped to the trade in sanitary boxes, similar to the manner in which bacon is shipped at present. In fact, packers welcome this suggestion, and the trade is equally ready to adopt the novel method. The advantages to the ultimate consumer are too obvious to be dwelled upon. The application of the present invention as intimated above insures a maximum of cleanliness in addition to rendering a superior article for less money than was formerly thought possible.

It will be understood, of course, that the device may be used for preparing other products as well as for toasting sandwiches. For example, it may be used for frying bacon. In this case, it is advisable to wrap the strips of bacon in an envelope of suitable wax paper and to insert this envelope between the heating plates of the device. The curling of the bacon strips will be avoided in this manner. The apparatus may also be used for broiling or frying meat or eggs, etc.

In view of the foregoing discussion, it will be understood that modifications of various kinds may suggest themselves in accordance with the use to which the invention is put, and it will, therefore, be obvious that I do not wish to be limited to the precise structure suggested in the drawings. What is considered new will be explained in the detailed description which is yet to follow, and will be particularly pointed out in the appended claims.

In order to accomplish the above objects and features, the invention contemplates a double toasting grill, comprising, in general, a stationary heating plate having a plane, solid, and continuously finished smooth toasting surface for receiving a sandwich, and having a projecting ledge on one side for confining the article to the plate and for preventing grease to be conducted beyond the plate to soil parts of the device exposed to view, the ledge also furnishing a guide for a second heating plate; a lever arm rotatably attached to said plate together with means for moving said lever arm in a plane perpendicular to the plane of the heating plate; a second heating plate having a plane, solid, and continuously finished smooth toasting surface for covering the sandwich received by said first plate; means for movably mounting said second plate on said lever arm; a balancing spring for counter-acting the weight of said lever arm and of said second plate and means for adjusting the tension of said spring; a heating element in each of said plates; and circuit means for energizing said heating elements to toast the sandwich or to prepare other foodstuff inserted between said plates.

The invention will be better understood from a detailed description of its parts and of its operation, which will be presented below with reference to the accompanying single sheet of drawings forming a part of this specification.

Referring now to the drawings,

Fig. 1 shows a perspective view of the double toasting grill;

Fig. 2 is a side elevation with some parts shown in cross section and other parts broken away to illustrate details more distinctly; and Fig. 3 is a top plan view of the device.

All parts are numbered alike throughout the various figures, and a certain figure will, therefore, be referred to only if necessary for explaining a detail.

Bearing in mind the principles of the invention as outlined previously, the detailed description will now be proceeded with.

In the drawings, numeral 1 indicates a suitable mounting plate to which are attached posts 2, 3, 4 and 5. Firmly attached to these posts, in a substantially horizontal position, is the lower stationary heating or toasting plate 6, the mounting being made by means of projections 11 and 13 which are integral with plate 6, and by washers 12 and 14 made of heat insulating material. A projecting ledge 15 is provided on the back side of the heating plate 6. This ledge serves for confining the article to the plate, for preventing grease from being conducted beyond the plate to soil parts of the device exposed to view, and it also furnishes a guide for the upper heating plate. The heating plate 6 is also provided with projections 14 and 15 having holes to receive a bolt 31 which attaches the operating lever 17 rotatably to the heating plate 6. The plate carries on its front side another projection 23 with an opening for receiving an adjusting screw 26. The lever 17 has a flare 22 at its lower end provided with a hole to which is attached one end of a balancing spring 24. The other end of this spring is inserted in a bracket 25 which has a threaded opening for screw 26. Thus, the tension of the spring 24 can be adjusted from the front of the apparatus, and the purpose of the spring is to balance the weight of the lever 17 and parts mounted on it. The curved lever 17, at its upper front end is provided with a screw 30 for rotatably attaching the upper heating plate 27 by means of the bearing projection 28. A handle 19 is mounted on the lever 17 by screws 20 and 21, and separated from it by a member 18 which is of heat insulating material, such as asbestos.

Heating elements 34 and 35 of some known and desirable design are inserted in the plates 6 and 27. These elements are indicated in Fig. 2 in which the plates have been shown partly in cross section. The wiring between the plates may be made by means of a protecting wire armature 32 which carries the conductors. A switch may be mounted in front of the device in any desirable and suitable manner. Since the construction of the heating elements and the wiring of the apparatus, including a switch, are generally known and well understood, I have limited their description to but a brief account. The elements may, of course, be chosen to furnish desirable degrees of heat from low and medium heat to high heat, and the switch may be selected according to these requirements.

In conclusion, it may be mentioned that the entire apparatus may be placed in an illuminated glass cage, protecting it from dust and from interfering curiosity of customers, and leaving an opening for the operator, who may prepare the sandwiches, or other food in the presence of the customer, thus retaining the advertising value of operating publicly and avoiding the disadvantages usually connected with the procedure.

What is claimed is:

1. In a cooking device of the character described, a stationary cooking plate, an operating lever arm mounted on said plate, a second cooking plate pivotally connected to the lever arm and being otherwise free, and a counterbalancing spring acting to balance the weight of the arm and said second plate.

2. In a cooking device of the character described, a stationary cooking plate, an operating lever arm mounted on said plate, a second cooking plate pivotally connected to the lever arm and being otherwise free, a counterbalancing spring acting to balance the weight of the arm and said second plate, and means for adjusting said spring to vary the effective force thereof.

3. In a cooking device of the character described, a lower plate, a lever pivoted intermediate its ends on the lower plate, an upper plate pivotally connected to the upper end of the lever and movable toward and away from the lower plate, and a counterbalancing spring connected to the lever and disposed beneath the lower plate.

4. In a cooking device of the character described, a lower plate, a lever, an upper plate pivotally connected to the lever and movable toward and away from the lower plate, and a counterbalancing spring connected to the lever and disposed beneath the lower plate.

5. In a cooking device of the character described, a lower plate, a lever, an upper plate pivotally connected to the lever and movable toward and away from the lower plate, a counterbalancing spring connected to the lever and disposed beneath the lower plate, and means for varying the effective force of the spring.

In witness whereof, I hereunto subscribe my name this 13th day of February, 1928.

CHARLES P. JAEGER.